US007412220B2

(12) United States Patent
Beyer

(10) Patent No.: US 7,412,220 B2
(45) Date of Patent: Aug. 12, 2008

(54) SIGNAL PROCESSING

(76) Inventor: Robert Patrick Beyer, 25B Athens Road, Onehunga, Auckland (NZ)

( * ) Notice: Subject to any disclaimer, the term of this patent is extended or adjusted under 35 U.S.C. 154(b) by 499 days.

(21) Appl. No.: 11/114,547

(22) Filed: Apr. 26, 2005

(65) Prior Publication Data

US 2005/0245221 A1 Nov. 3, 2005

(30) Foreign Application Priority Data

Apr. 26, 2004 (NZ) .................................... 532572

(51) Int. Cl.
*H04B 1/10* (2006.01)

(52) U.S. Cl. ....................... 455/222; 455/221; 455/219; 381/1; 381/17; 381/18; 381/98

(58) Field of Classification Search ................. 455/222, 455/221, 219, 22; 381/1, 17, 18, 98
See application file for complete search history.

(56) References Cited

U.S. PATENT DOCUMENTS

| | | | | |
|---|---|---|---|---|
| 5,872,851 | A * | 2/1999 | Petroff | 381/18 |
| 5,930,373 | A | 7/1999 | Shashoua et al. | |
| 6,285,767 | B1 * | 9/2001 | Klayman | 381/17 |
| 7,027,601 | B1 * | 4/2006 | Johnston | 381/56 |
| 7,233,833 | B2 * | 6/2007 | Little | 700/94 |

OTHER PUBLICATIONS

Orban, Bob, *How Do I Get the Bass Sound I Want?*, http:/ /www.orban.com, Apr. 2001.

* cited by examiner

*Primary Examiner*—Sanh D Phu
(74) *Attorney, Agent, or Firm*—Brouse McDowell

(57) ABSTRACT

Signal processing apparatus produces an audio signal suitable for conveying a psychoacoustic perception of a low frequency audio signal to a listener, the apparatus generates harmonics of the low frequency signal by shaping the waveform of the low frequency signal with respect to time and/or level. This may be achieved using a peak-hold generator and a rectifier, or using a peak-hold-decay generator.

8 Claims, 8 Drawing Sheets

FIG−1

SIGNAL PROCESSING

This application claims priority from New Zealand Patent No. 532,572, entitled IMPROVEMENTS IN OR RELATING TO SIGNAL PROCESSING, filed Apr. 26, 2004, which is incorporated herein by reference.

FIELD

This invention relates to audio signal processing methods and apparatus, and has particular application to delivering more apparent bass through the psychoacoustic perception of bass frequencies.

BACKGROUND

Audio transducers such as loudspeakers frequently have difficulty reproducing bass (i.e. low audio frequency) audio frequencies.

It is known to utilise harmonics to generate apparent bass audio frequencies. This results from a psychoacoustic phenomenon where harmonics of low frequency sounds lead the listener to "hear" the fundamental low frequency even though the fundamental is not present.

Known apparatuses and methods vary signals over their dynamic range (i.e. volume or signal level) using apparatuses such as compressors or limiters.

OBJECT

It is an object of the invention to provide an improved audio signal processing method, or an improved audio signal processing device which will at least provide a useful alternative to existing methods and apparatus.

Further objects of the invention may become apparent from the following description.

SUMMARY OF INVENTION

In one aspect the invention consists in signal processing apparatus for producing an audio signal suitable for conveying a psychoacoustic perception of a low frequency audio signal to a listener, the apparatus including a peak-hold generator means to generate harmonics of the low frequency signal by shaping the waveform of the low frequency signal with respect to time.

Preferably the peak-hold generator includes a signal decay means to shape the waveform of the low frequency signal with respect to level.

Preferably the harmonic generation means generate odd and even harmonics.

Preferably the apparatus includes a rectifier to generate even harmonics.

Preferably the peak-hold generator comprises a peak-hold-decay generator.

Preferably the low frequency waveform is shaped asymmetrically with respect to time and with respect to level.

In a further aspect the invention consists in a method of processing a low frequency audio signal to produce an output audio signal suitable for conveying a psychoacoustic perception of a low frequency audio signal to a listener, the method including shaping the waveform of the low frequency signal with respect to time by tracking the low frequency signal to a substantially peak magnitude until a zero crossing then tracking the signal again in the opposite polarity.

Preferably the method includes the step of shaping the waveform of the low frequency signal with respect to time and with respect to level by tracking the low frequency signal to a substantially peak magnitude then allowing the peak to decay at a predetermined rate.

The invention may also broadly be said to consist in any new feature or combination of features disclosed herein.

Further novel aspects of the invention will become apparent from the following description.

DRAWING DESCRIPTION

Embodiments of possible implementations of the invention will be described below by way of example with reference to the accompanying figures in which.

DETAILED DESCRIPTION

Figure 1:
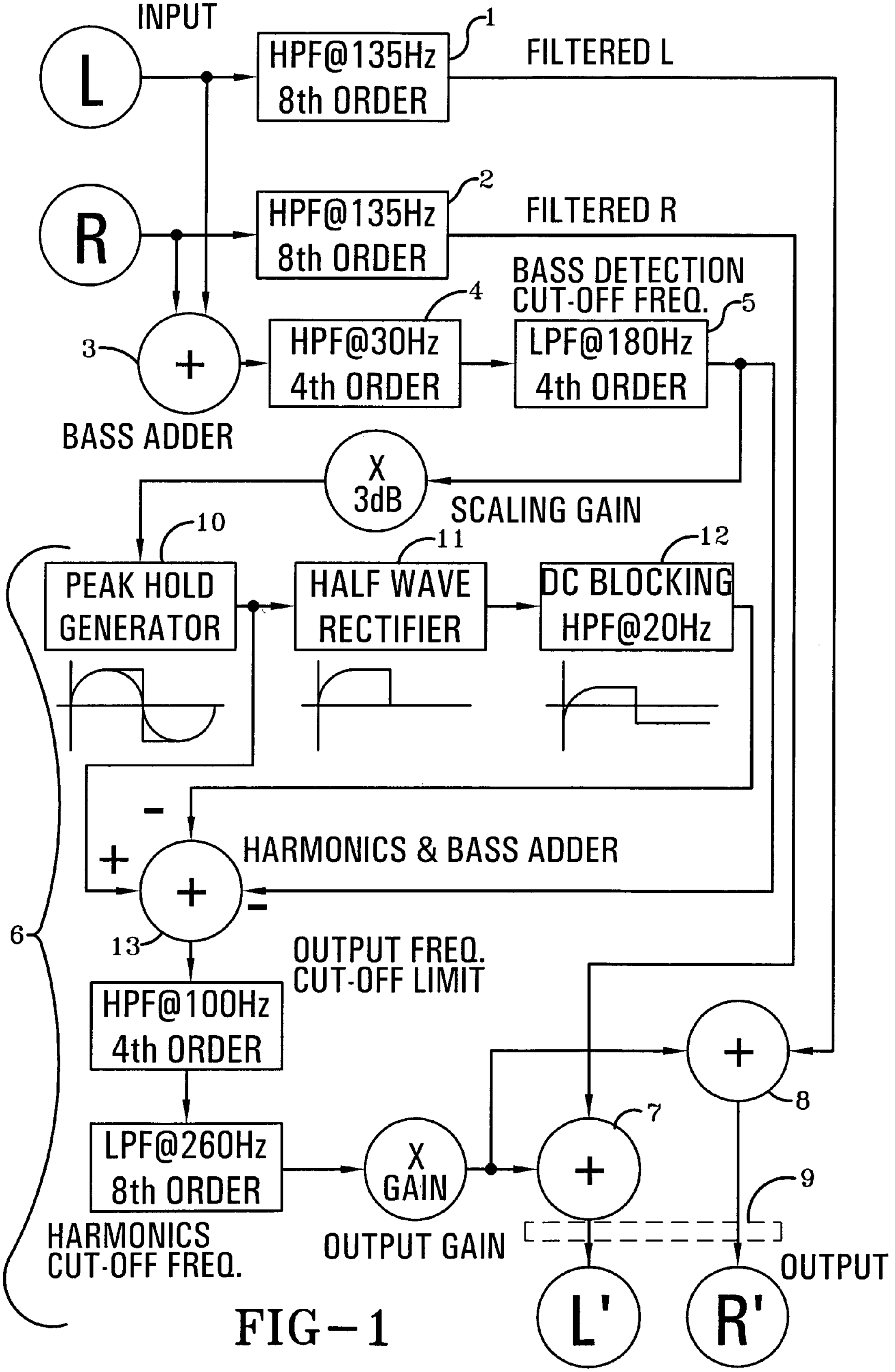
FIG. 1 is a schematic block diagram of a first embodiment of a signal processing circuit.

Referring to FIG. 1, a block diagram of a first embodiment of a possible implementation of a signal processing system is shown.

The circuit shown in FIG. 1 may be implemented in software, or may be implemented using physical hardware. Furthermore, it may be implemented digitally or in analog form. There are a multiple methodologies and techniques which can be used to achieve the desired results in either form.

The purpose of the system is to deliver more apparent bass to a listener from any audio source material by means of any audio delivery mechanism.

It is desirable to High Pass filter (1,2) the source input audio signal per channel (L, R, etc., although the invention is applicable to single channel or multiple channel audio systems) to remove the bass components, generating a filtered input signal per channel for use later (Filtered Input). The source input audio signal channels are preferably then summed (3) to generate a mono source signal which contains the sum total of the bass information in the original audio. This resultant signal is then High Pass (4) and Low Pass (5) filtered to remove the ultra-low infrasound frequencies, and the non-bass frequencies, generating the bass source signal.

Harmonics Generation, generally referenced (6), is used to introduce harmonics into the resultant audio. The results of this process generate the bass output signal, which is then merged with the filtered input signals. The details of this process are described below.

The resulting output audio is generated by summing the bass output signal into each of the filtered input signals (7,8), and presenting the result to the audio output (speakers, headphones, etc.). Optionally a Peaking Equalizer (9) (akin to the standard "Bass Boost" commonly found on stereo systems)

may be added or utilised afterwards to further provide output bass level adjustment to the audio output, thus further increasing the bass response, but also including all the harmonic content already introduced.

It is preferable to implement the Harmonics Generator section (6) as follows: The bass source signal is presented to a Peak-Hold Generator (10). The Peak-Hold Generator generates an output signal which tracks the input signal, continuously increasing (decreasing) as the input signal rises (or falls), but holds the signal at the maximum value on both the positive and negative extents of the input signal. When the input signal transitions from positive to negative, or negative to positive signal level, the output of the Peak Hold Generator is set to 0 (Zero). This generates odd harmonics of the fundamental frequency by symmetrically shaping the audio signal over time. This process can be readily performed since the human ear is "phase deaf", i.e. the phase of the audio signal cannot be determined by a listener. By shaping an audio signal in this manner, the harmonics generator can introduce a specific series of harmonics to produce the psychoacoustic bass response desired without concern for the phase of the output harmonics.

It is preferable to have a hysteresis function applied to the bass input, which eliminates any output from the Peak-Hold Generator if the input signal level is below a certain threshold. This is achieved by expanding the signal transition range from exclusively being 0 (Zero), to a +/−signal bounds.

The Peak-Hold Generator output (peak-hold output signal) is then preferably Half-Wave Rectified (11) (only positive portions of the original signal retained), which generates even harmonics. This is followed by a DC Blocking Filter (12), which removes the DC Bias on the resultant signal. This is the resultant rectified output signal.

The peak-hold output signal, bass source signal, and rectified output signal are then combined (by any desired combination of addition and/or subtraction) at alegabraic adding stage 13, with a final output level gain, to generate a resultant bass signal with a strong harmonic content. This harmonic bass signal is then High Pass and Low Pass filtered to remove and reduce the harmonic content which is undesired, or can not be reproduced by the audio output methodology to be used.

The algorithm may readily be realized in both Digital and Analogue forms. In Digital form, the algorithm may be realized through the utilisation of Audio BiQuad filters for example to provide the required filters, and elementary mathematical functions to implement the Peak-Hold and Rectified signal generation of the Harmonics Generator.

In Analogue form, the Peak Hold generator may be realised by a controllable Peak Detection circuit, or by a capacitor charging circuit, or by any other means to generate an output signal, held at the peak of the source input bass signal, until a zero crossing (signal transition with threshold) is reached. The Half-Wave rectification and DC blocking can be realised in a variety of methods from a simple rectifier diode, to an operational amplifier.

The Wave-Shaping performed by the Peak Hold Generator may be described as follows:

a). Track the input signal on the rising or falling input.

b). For +ve and −ve values, hold the signal at that level.

c). At the zero crossing, reset the held value back to Zero.

The hysteresis function is preferably applied to the input level, limiting the output to occur only when the input signal is above the specified signal level (specified as −30 dB). This may be implemented by extending the 'reset to zero' range of the input to a +/−30 dB level around the Zero input. This eliminates transient crossings, and additionally properly detects and generates the lowest bass frequency present without generating any higher frequency bass components unnecessarily.

The peak-hold process with hysteresis may be described succinctly through the following:

S(t)—Source signal at time (t)

O(t)—Output signal at time (t)

Level—Hysteresis level (minimum +/−level/volume required)

```
If (S(t) >= −Level) AND (S(t) <= +Level)
      O(t) = 0.0
else if (S(t) > O(t−1)) AND (S(t) >0.0)
      O(t) = S(t)
else if (S(t) < O(t−1)) AND (S(t) <0.0)
      O(t) = S(t)
else
      O(t) = O(t−1)
end if
```

The +3 dB scaling gain in the processing path was added to properly balance the various harmonics and levels of the signals being merged. A 3 dB drop in the initial source signal could similarly be used, with the final output gain being correspondingly raised to compensate. The gain was implemented in this way by reason of the software interface, which during development permitted the gains of each signal to be individually controlled. Adding in this gain resulted in a nominal '0 dB' gain factor being applied to each input for the harmonics and bass summation operation.

The frequency cut-off values listed in FIG. 1 were specifically chosen to generate a 0 dB overall gain (with respect to the input) in the software implementation for 100 Hz capable speakers. The preferred software implementation utilises Digital Audio BiQuad Filters ($2^{nd}$ order) appropriately cascaded to generate the desired filter order. Headphones or speakers which can handle lower frequencies may require different filter cut-off settings to be used. A simple single adjustment can be done by changing the output frequency cut-off limit, to add more of the fundamental frequency back into the output, thus resulting in an even richer bass, however this will correspondingly add power to the output signal.

The 0 dB gain path was verified by running a −15 dB, 20 Hz to 1 KHz sinusoidal sweep through the software implementation and adjusting the filter cut-offs to produce a relatively flat −15 dB output signal with the harmonics added appropriately. We have found that the output does have a modest 1.5 dB gain for frequencies between 70 to 100 Hz, and also has a 1.5 dB drop around the 180 Hz input filter cut-off frequency.

The spectral content of the generation adds harmonics heavily at low frequencies (below 130 Hz), resulting in frequencies as low as 30 Hz becoming 'audible' on speakers with a nominal response of 100 Hz, through the principle of the missing fundamental. Higher input frequencies result in only one or two harmonics being added as the final Harmonics cut-off filter attenuates these higher order harmonics very strongly.

The generated harmonics include the fundamental and all odd and even harmonics in a smoothly decaying spectrum. While the fifth and higher odd harmonics are also generated, resulting in non-musical tones, the choice of cut-off frequencies severely limits these being utilised for most input signals. Signals below 50 Hz will have these harmonics added; however these harmonics appear to greatly aid in these infrasound frequencies being successfully perceived, and in some cases even generate a lower perceived frequency than was originally present.

For the initial bass input adder, two different methods were explored:

a). Direct Summation (L+R) as shown on the diagram.

b). Filtered Summation (L−Filtered R)+(R−Filtered L).

The second method proved to provide a much greater vocals rejection capability on most input media, which reduced the effect of harmonics being introduced on very low frequency male voices. This however did introduce a side-effect of a sharp frequency notch at the cut-off, unless a very high order filter was utilised with some overlap within the filters.

Figure 2:
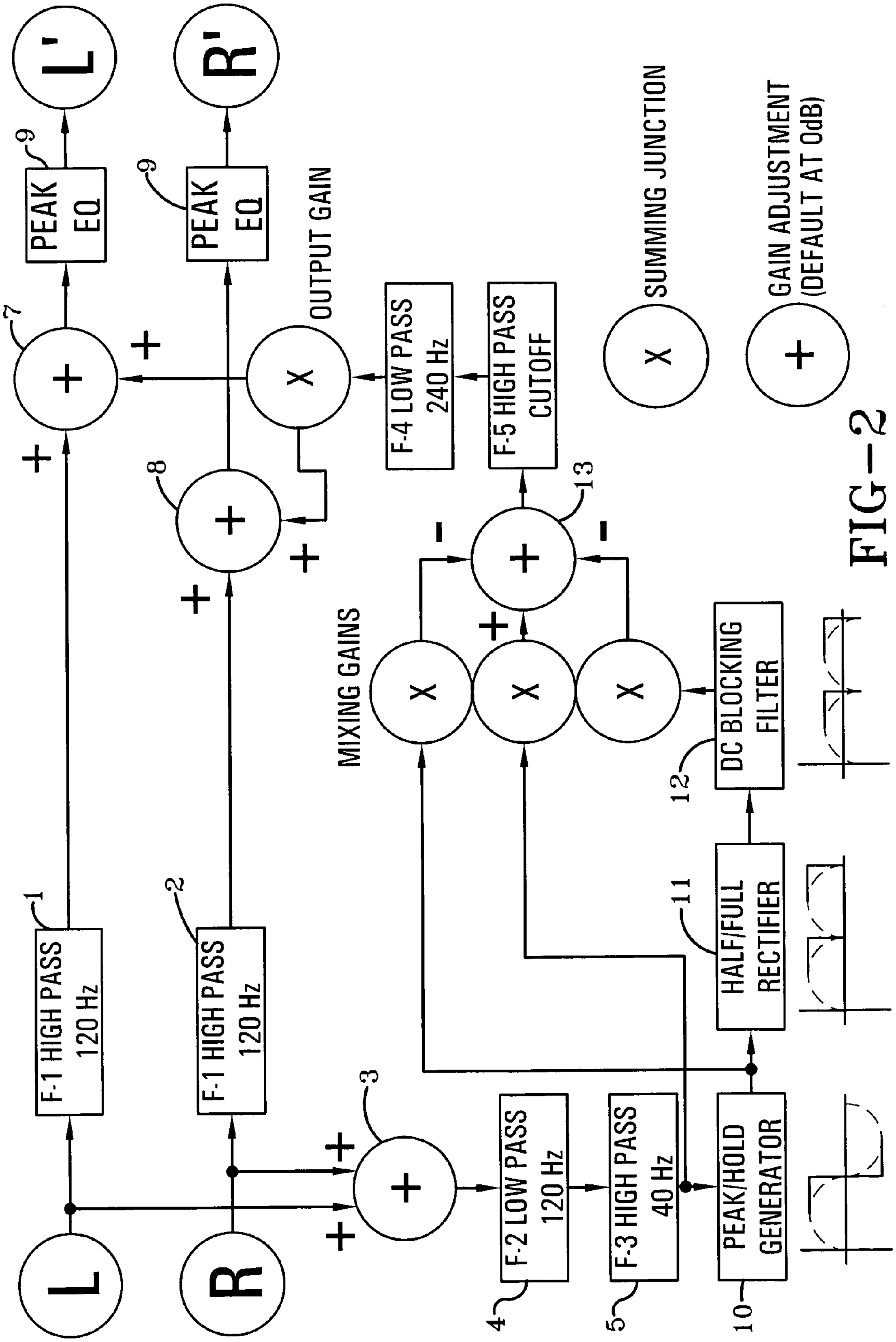
FIG. 2 is a schematic block diagram of a second embodiment of a signal processing circuit.

In FIG. 2 a second embodiment of the invention is shown. Features of FIGS. 2, 3 and 4 which are the same as, or similar to, that of FIG. 1 have the same reference numerals. As can be seen, the filters in the embodiment of FIG. 2 have slightly different cut-off frequencies than some of the filers of FIG. 1, and the generated harmonics are subtracted from the fundamental at the adding stage 13. Also, and the gain of the each of the components to be added/subtracted at adding stage 13 may be controlled.

Figure 3:
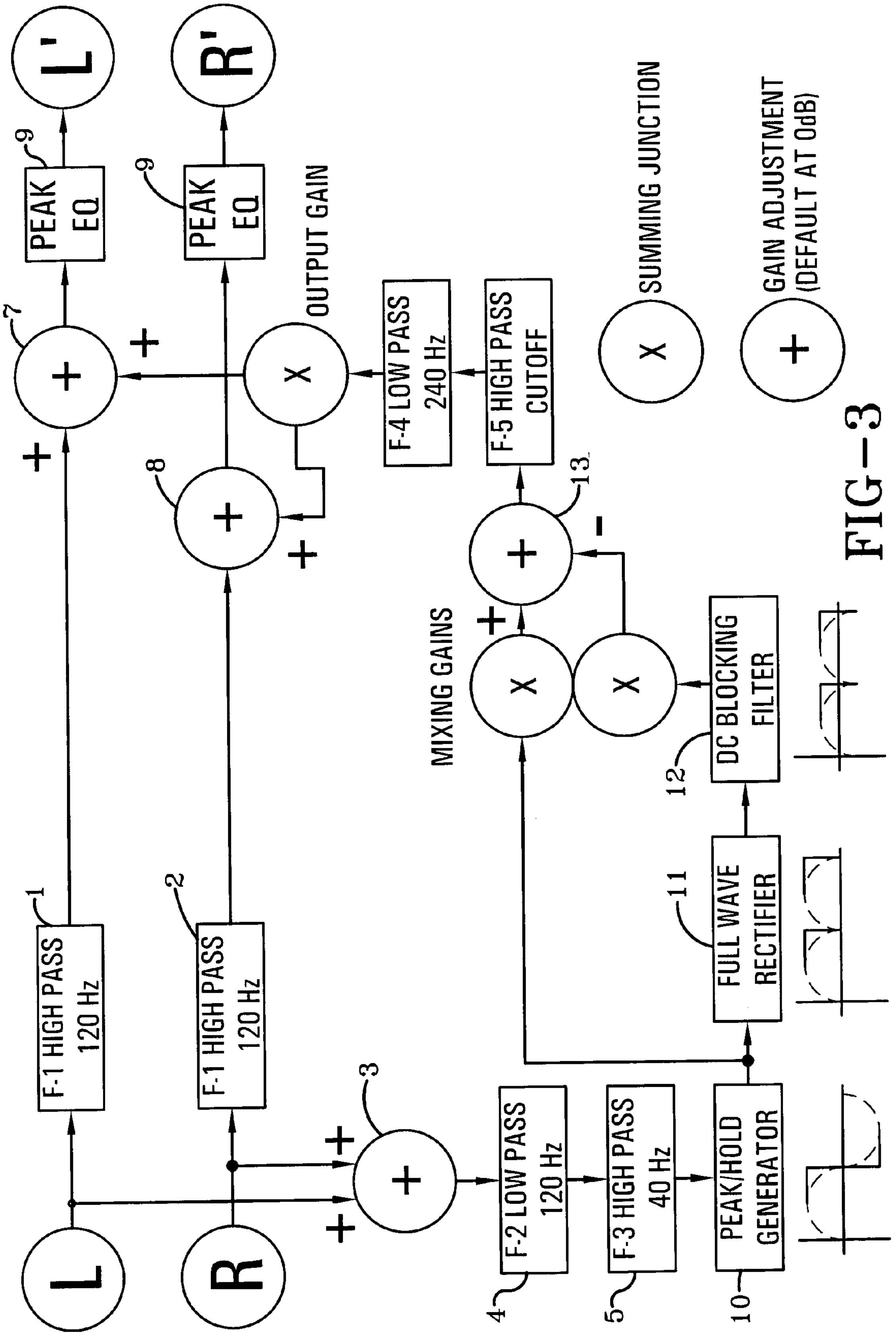
FIG. 3 is a schematic block diagram of a third embodiment of a signal processing circuit.

In the embodiment of FIG. 3, the embodiments of the preceding figures have been simplified by adding the odd and even harmonic components together without adding or subtracting the fundamental.

Figure 4:
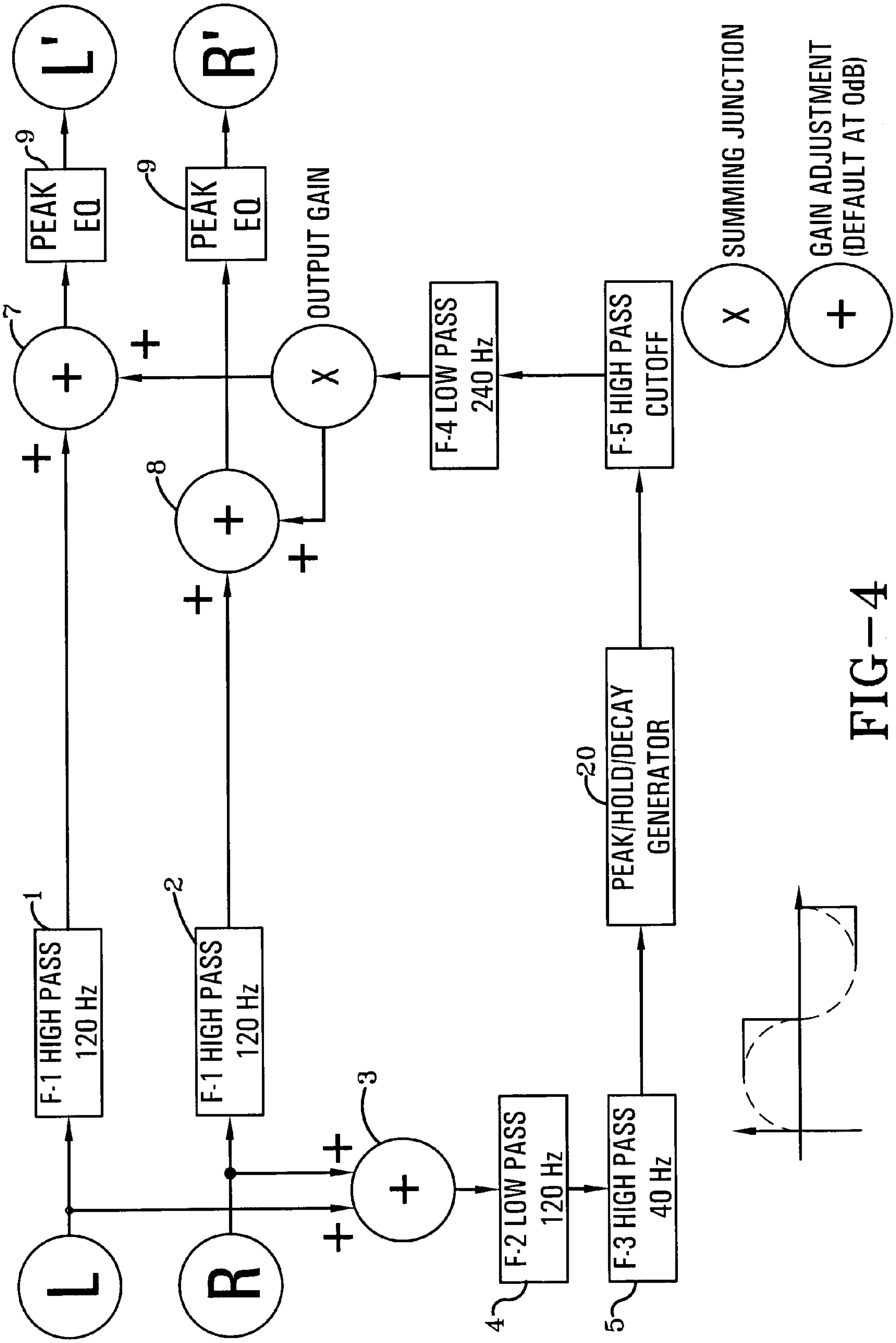
FIG. 4 is a schematic block diagram of a fourth embodiment of a signal processing circuit.
Figure 5:
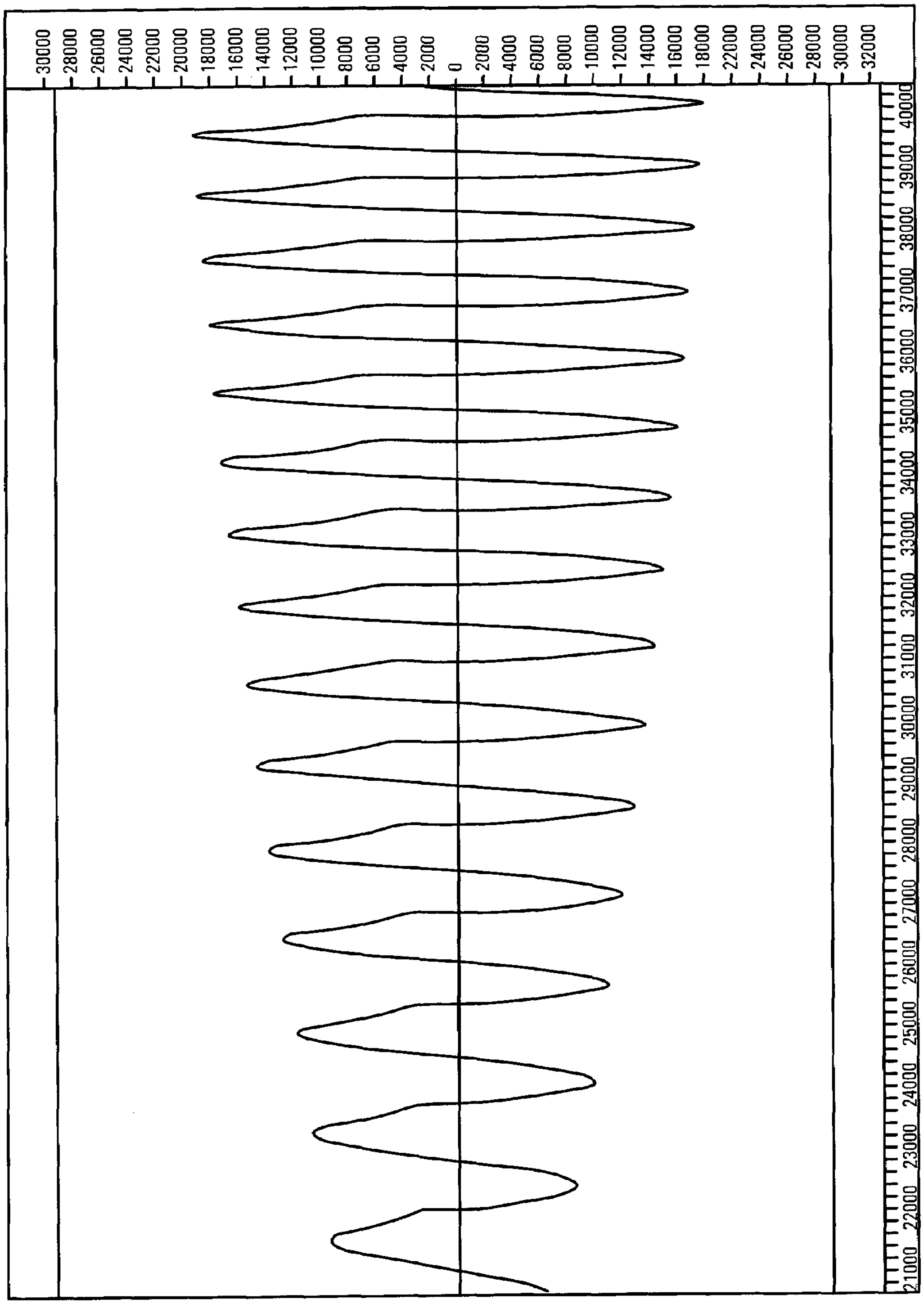
FIG. 5 is a graph showing an example of a harmonics waveform generated by a peak hold decay generator used in the embodiment of FIG. 4, with time on the horizontal axis indicated by sample at a 44.1 kHz sampling rate and signal level on the vertical axis.

In the embodiment of FIG. 4 the duration of the hold period for the peak-hold generator is modified to further introduce and generate the desired harmonics. Therefore, a peak-hold-decay generator 20 replaces the separate peak-hold generator, rectifier and DC blocking filter. This further exploits the property of the human ear being "phase deaf", and allows the peak-hold generator to be modified to generate the odd and even harmonics in one process. In a preferred embodiment this is achieved through controlled decay of the held signal. It is also preferred that a different transition point is used for resetting the held signal.

The process may be described succinctly in as follows:

S(t)—Source signal at time (t)

O(t)—Output signal at time (t)

Decay—A specified signal decay factor abs( )—Absolute level/volume of the signal

```
if (abs(S(t))>O(t−1))
    O(t) = S(t)
else
    O(t) = Decay * O(t−1)
end if
```

This generates a waveform which is shaped asymmetrically not only with respect to time but also with respect to level, thus generating both even and odd harmonics as a result. The degree of harmonic generation may be easily controlled through controlling the rate or properties of the decay. In a preferred embodiment this is done by controlling a Decay factor, which in this example implementation operates similarly to a capacitor discharge curve. The Actual Decay factor must be below 1.0 (i.e. less than unity gain) in order to appropriately decay the output signal.

Figure 6:
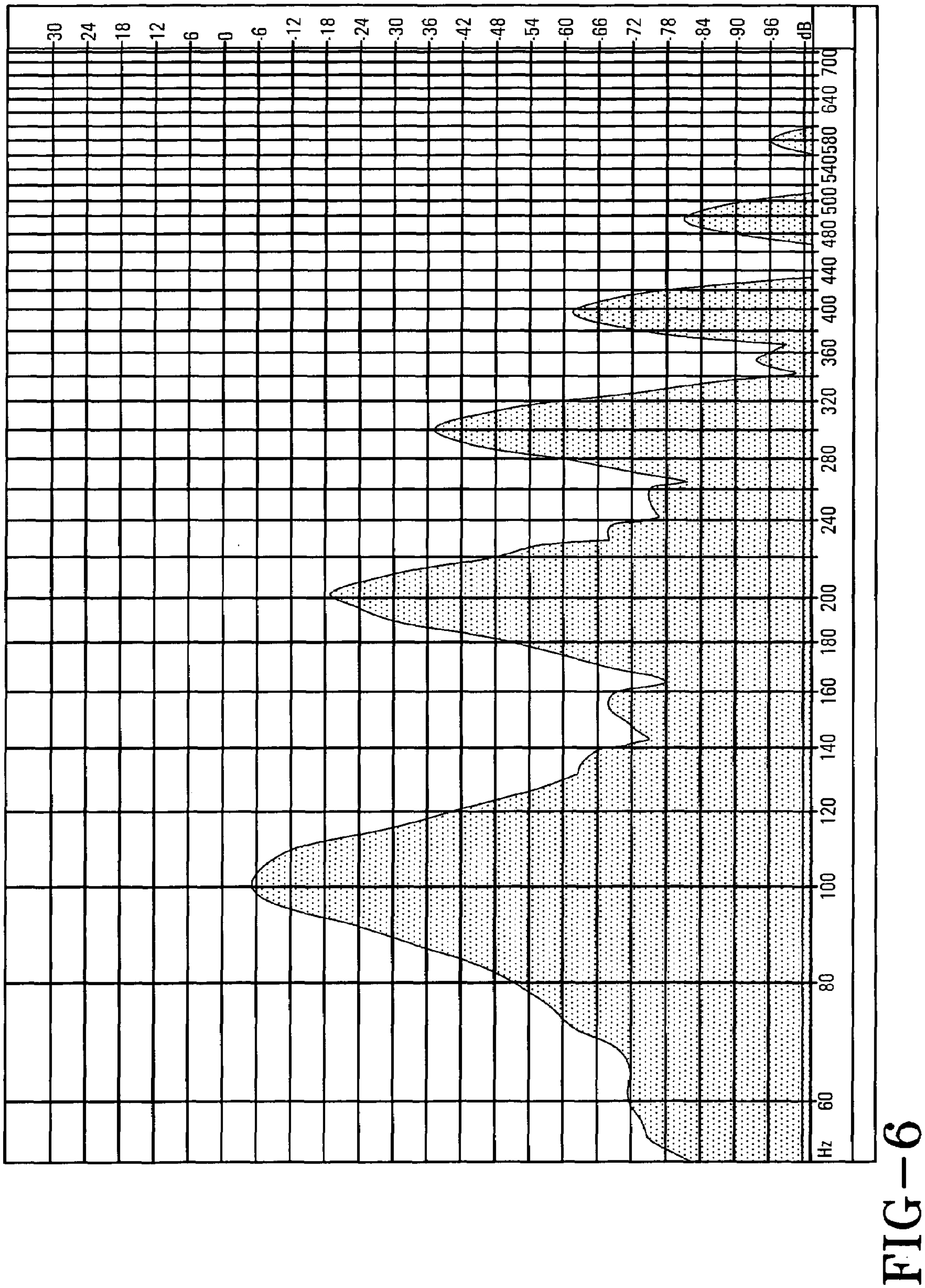
FIG. 6 is a graph of frequency (Hz) against signal strength (dB) of a first example of harmonics content.
Figure 7:
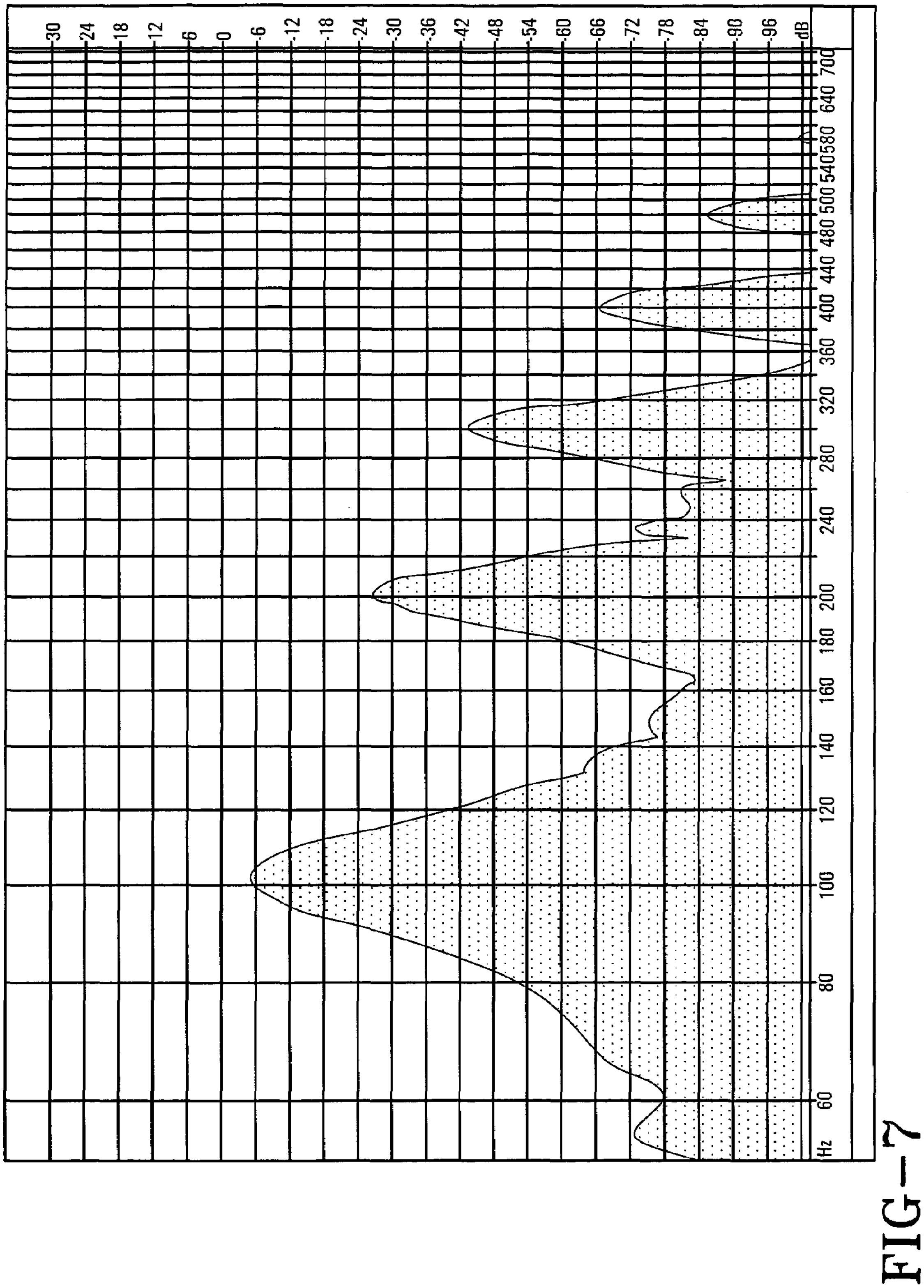
FIG. 7 is a graph of frequency (Hz) against signal strength (dB) of a second example of harmonics content.
Figure 8:
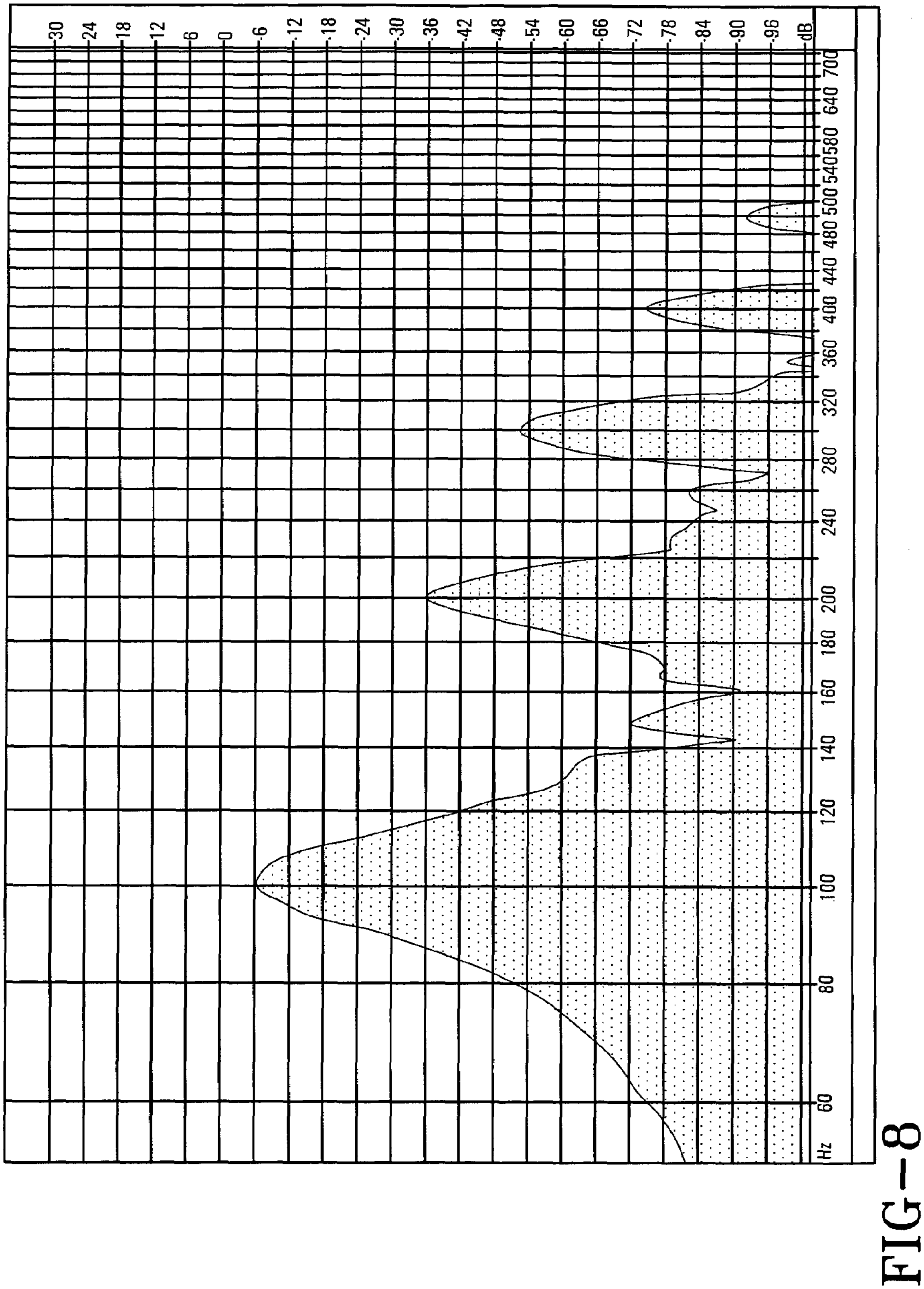
FIG. 8 is a graph of frequency (Hz) against signal strength (dB) of a third example of harmonics content.

The decay factor may be calculated through the following example formulae:

$$Decay=2.0-\exp(Setting/SampleRate)$$

Where "Setting" is an arbitrary user configurable decay constant used to control the degree of harmonics introduced. For an example implementation, assuming a SampleRate of 44.1 kHz audio, the Setting range is arbitrarily set to 100 to 1000. Utilising these constants, the resultant audio signals and their spectrums are as shown in FIGS. 5 to 8. In FIG. 6 the Setting is 200, in FIG. 7 it is 500, and in FIG. 8 it is 1000.

The harmonic spectral content has been validated by utilising a Chirp sinusoidal sweep signal as input through the various processes outlined above. The gain and filter settings in each case were appropriately adjusted to provide a consistent output level for the entire sweep process, while still introducing the appropriate level of harmonic content desired.

Those skilled in the art will realise that many different implementations of the invention are possible within the scope of the invention as described in this document. For example, there are many different realisations and techniques of signal bass extraction and recombination (multi-band filtering, input difference summation, use of LFE channel only from multi-channel audio sources, etc.) any of which may be applied to the present invention.

Having thus described the invention, it is now claimed:

1. Signal processing apparatus for producing an audio signal suitable for conveying a psychoacoustic perception of a low frequency audio signal to a listener, the apparatus including a peak-hold generator to generate harmonics of the low frequency signal by shaping the waveform of the low frequency signal with respect to time by tracking the low frequency signal to a substantially peak magnitude until a zero crossing, then tracking the signal again in the opposite polarity.

2. Signal processing apparatus as claimed in claim 1 wherein the peak-hold generator includes a signal decay element to shape the output waveform of the low frequency signal with respect to level.

3. Signal processing apparatus as claimed in claim 2 wherein the peak-hold generator generates odd and even harmonics.

4. Signal processing apparatus for producing an audio signal suitable for conveying a psychoacoustic perception of a low frequency audio signal to a listener, the apparatus including a peak-hold generator means to generate harmonics of the low frequency signal by shaping the waveform of the low frequency signal with respect to time and a rectifier to generate even harmonics.

5. Signal processing apparatus as claimed in claim 2 wherein the peak-hold generator comprises a peak-hold-decay generator.

6. Signal processing apparatus as claimed in claim 2 wherein the low frequency waveform is shaped asymmetrically with respect to time and with respect to level.

7. A method of processing a low frequency audio signal to produce an output audio signal suitable for conveying a psychoacoustic perception of a low frequency audio signal to a listener, the method including shaping the waveform of the low frequency signal with respect to time by tracking the low frequency signal to a substantially peak magnitude until a zero crossing then tracking the signal again in the opposite polarity.

8. A method as claimed in claim 7 including the step of shaping the waveform of the low frequency signal with respect to time and with respect to level by tracking the low frequency signal to a substantially peak magnitude then allowing the peak to decay at a predetermined rate.

* * * * *